United States Patent Office 2,756,119
Patented July 24, 1956

2,756,119

VAT DYESTUFF COMPOSITION

Fritz Baumann, Leverkusen-Bayerwerk, and Berthold Bienert, Leverkusen-Wiesdorf, Germany, assignors to Farbenfabriken Bayer Aktiengesellschaft, Leverkusen, Germany, a corporation of Germany No Drawing. Application October 30, 1951, Serial No. 253,988

Claims priority, application Germany October 29, 1948

1 Claim. (Cl. 8—34)

The present invention relates to new compositions of matter which are useful for dyeing textile fibers from the vat. This is a continuation-in-part application of our application Ser. No. 81,025, filed March 11, 1949, entitled "Vat Dyestuffs," now Patent No. 2,613,128.

The phthalocyanines which are distinguished by clear shades and excellent fastness properties have been used as yet only for pigmenting, as substantive dyestuffs and as dyestuffs for lake-making. In British Patent No. 322,169 some indications are given of phthalocyanines being suitable for the dyeing from the vat. These indications refer both to unsulfonated and sulfonated products, specific mention being made of the copper, nickel and iron complex. In reality, unsulfonated copper and nickel phthalocyanines have no vatting properties. Sulfonation products thereof are capable of being vatted but do not dye the fiber from the vat to any material extent. Unsulfonated as well as sulfonated iron phthalocyanines are capable of use as vat dyes, also exhibit some affinity to the fiber, but yield unsatisfactory shades.

We have now found that cobalt phthalocyanines are far superior to all other phthalocyanines as far as vatting properties are concerned. Contrary to the unsubstituted copper and nickel complex the unsubstituted cobalt phthalocyanine is capable of use as a vat dye and, on dyeing from the vat, yields essentially clearer shades than the iron complex. Furthermore, in contrast to all other phthalocyanines as far as these are vattable at all the vatted cobalt phthalocyanine is distinguished by excellent stability on dyeing from the hot vat. The property of vatting and yielding clear valuable dyeings on textiles from the vat is not restricted to the unsubstituted cobalt phthalocyanine. According to our present invention, the above properties to a larger extent are met with those substitution products of cobalt phthalocyanine the hydrophilic property of which has been increased by substitution. For accomplishing this effect, substituents of different kind may be used, for instance, sulfonic acid groups, sulfonamide groups (the nitrogen of which may be mono- or disubstituted by alkyl-, aryl- or aralkyl radicals), sulfinic acid groups, carboxylic acid groups, carboxylic amide groups, cyano groups, hydroxy groups, alkoxy groups, —SH groups, —S. alkyl groups, nitro groups, amino groups, or acylamino groups. These groups may be introduced into the cobalt phthalocyanine as usual, i. e. either subsequent to complex formation or in the course of preparing the complex by starting from phthalic acids, phthalonitriles etc. containing such substituents, e. g. 4-sulfophthalic acid, 4-methoxyphthalic acid etc. As a matter of fact, besides such substituents as increase the hydrophilic property, the cobalt phthalocyanines may also contain substituents which exert the contrary effect, provided however, that there are sufficient hydrophilic substituents in order to accomplish at least a higher hydrophilic character than in the case of cobalt phthalocyanine. All these substitution products have generally better vatting properties than the unsubstituted cobalt phthalocyanine itself. This is true with the reservation that the number of hydrophilic groups must not be so high as to render the products easily soluble in water as otherwise the affinity to the fiber of the vatted product will be impaired.

Among these substituents the sulfonamides (the nitrogen of which may be mono- or dialkylated by alkyl-, aryl- or aralkyl-radicals) are of particular importance. The production of these compounds may be carried out as above mentioned, e. g. by starting with a corresponding mixture of phthalic acids substituted with non-hydrophilic groups and phthalic acids substituted with alkylated or non-alkylated sulfonamide groups.

These afore mentioned cobalt phthalocyaninesulfonamides will dye cellulose fibers according to the methods usually applied to vat dyestuffs. In general, the best affinity is reached when dyeing from the hot vat. Many cobalt phthalocyanines are capable of being vatted even in a weakly alkaline medium, for instance, in the presence of ammonia and, therefore, may also be used for dyeing animal fibers from the vat.

The following examples illustrate the invention without restricting it thereto, the parts and percentages being by weight if not otherwise stated.

Examples A–C describe various dyeing processes whereas Examples 1–5 refer to the preparation of various dyestuffs to be used for such dyeing processes.

*Example A* describes the vat dyeing with cobalt phthalocyanine vat dyestuffs on cotton:

100 parts by volume of a cobalt phthalocyanine paste (corresponding to 1 part of 100% dyestuff) are added to 650 parts by volume of water and 7 parts by volume of concentrated caustic soda solution (38° Bé.) at 50° C., 40 parts by volume of sodium hydrosulfite solution (1:10 dissolved in water) are caused to react with the above mixture for 15 minutes at 50° C., 200 parts by volume of Glauber's salt solution (1:10 dissolved in water) are then added and 50 parts of cotton are dyed in the usual manner at 50° C. for one hour. After lifting the cotton is squeezed off and hung in the air for 10 minutes; it is rinsed in cold water, the dyeing is treated with dilute sulfuric acid (2 parts by volume per 1000 parts by volume of water) and it is rinsed once more with water. The dyeing is then washed at the boil with Marseilles soap (2 parts per 1000 parts by volume of water), rinsed and dried. Full, blue to green, olive-green or grey shades are obtained.

*Example B.*—3 parts by volume of caustic soda solution of 38° Bé., 20 parts by volume of a paste of a cobalt phthalocyanine 1:100 (corresponding to 0.2 part) of the 100% dyestuff and 8 parts by volume of a sodium hydrosulfite solution (1 part dissolved per 10 parts by volume of water) are added to 170 parts by volume of water of 60° C. After 15 minutes 10 parts of cotton are dyed therein in the usual manner and, after hanging in the air, are finished as described in example A. That process can be modified by substituting 3 parts by volume of caustic soda solution by 4.5 parts by volume of caustic soda solution or by adding 40 parts by volume of Glauber's salt solution (1 part per 10 parts of water).

*Example C* describes the process of a vat dyeing on wool: 0.2 part of a cobalt phthalocyanine easily capable of being vatted (for instance the dyestuff obtained according to Example 2) is vatted by means of 2 parts by volume of concentrated ammonia (25%) and 0.75 part of sodium hydrosulfite in 120 parts by volume of water at about 75° C. The vat is then filled up to 500 parts by volume by adding water. 10 parts of wool are dyed in this liquor in the usual manner at 51–52°

C. for 1 hour. After lifting and wringing out the wool is hung in the air for 20 minutes, rinsed with water and treated with dilute acetic acid (5 parts by volume of glacial acetic acid per 1000 parts by volume of water), rinsed and dried. Dyeings of good fastness properties are obtained.

EXAMPLE 1

A mixture of 4.44 parts of phthalic anhydride
2.26 parts of phthalimide-4-sulfonamide
1.55 parts of cobalt sulfate )83%)
1.18 parts of ammonium chloride
14.5 parts of urea and
0.18 part of ammonium molybdate is gradually added to 14.5 parts by volume of trichlorobenzene and the melt is further heated at 180° C. for 5–6 hours. About 30 parts by volume of methanol are stirred into the melt while hot. The dyestuff thus obtained is sucked off and washed out with methanol. By boiling out with dilute hydrochloric acid, sucking off and washing with water the impurities are removed from the dyestuff. After dyeing a cobalt phthalocyanine with good vatting properties is obtained which dyes cotton full, very clear, blue shades of excellent fastness to light. The color of the vat is olive.

EXAMPLE 2

A mixture of 11.1 parts of phthalic anhydride
6.1 part sof phthalimide-4-sulfomethylamide
4.7 parts of cobalt sulfate (83%)
2.5 parts of ammonium chloride
24.0 parts of urea and
0.4 part of ammonium molybdate is gradually added to 30 parts by volume of trichlorobenzene of 180° C. and the melt is further heated at 180° C. for about 6 hours. On proceeding as described in Example 1 a cobalt phthalocyanine is obtained which after pasting from a mixture of sulfuric acid monohydrate and chlorosulfonic acid (5:1), dyes cotton from yellow-olive colored vat full, blue shades of good fastness to water and excellent fastness to light.

EXAMPLE 3

A mixture of 8.88 parts of phthalic anhydride
5.08 parts of phthalic acid-4-sulfodimethyl amide
3.74 parts of cobalt sulfate (83%)
2.34 parts of ammonium chloride
29.00 parts of urea and
0.34 part of ammonium molybdate is gradually added to 20 parts by volume of nitrobenzene at 180° C. and the melt is further heated at 180° C. for about 6 hours.

On proceeding as described in Example 1 a cobalt phthalocyanine is obtained which, after pasting from a mixture of sulfuric acid monohydrate and chlorosulfonic acid (5:1), dyes cotton from yellow-olive colored vat full, greenish-blue shades of excellent fastness to light and good fastness to water.

EXAMPLE 4

A mixture of 8.5 parts of 4-bromophthalic anhydride
3.05 parts of phthalimide-4-sulfomethylamide
2.35 parts of cobalt sulfate (83%)
1.25 parts of ammonium chloride
12.00 parts of urea and
0.2 part of ammonium molybdate is gradually added while stirring to 15 parts by volume of trichlorobenzene of 180° C. and the melt is further heated at 180° C. for about 6 hours.

On proceeding as described in Example 1 a cobalt phthalocyanine is obtained which after pasting dyes cotton from olive-colored vat full, greenish shades.

EXAMPLE 5

A mixture of 4.84 parts of diphenyl-3.4-dicarboxylic acid
4.80 parts of phthalimide-4-sulfomethylamide
1.84 parts of cobalt sulfate (83%)
0.98 part of ammonium chloride
9.44 parts of urea and
0.16 part of ammonium molybdate is introduced while stirring into 12 parts by volume of trichlorobenzene at 180° C. The procedure is then as described in Example 1. The cobalt dyestuff thus obtained dyes, after pasting from ethyl sulfuric acid, cotton from yellow-olive colored vat full, greenish-blue shades.

We claim:

A vat dyeing composition comprising a substituted cobalt phthalocyanine selected from the group consisting of cobalt phthalocyanine mono-sulfonamides, cobalt phthalocyanine-N-mono-alkyl monosulfonamides, and cobalt phthalocyanine-N-dialkyl mono-sulfonamides, said cobalt phthalocyanine being slightly soluble to insoluble in water, sodium hydrosulfite, water, and caustic soda.

References Cited in the file of this patent

UNITED STATES PATENTS

| | | |
|---|---|---|
| 2,300,572 | Hoyer | Nov. 3, 1942 |
| 2,459,771 | Fox | Jan. 18, 1949 |
| 2,493,724 | Mayhew | Jan. 3, 1950 |
| 2,528,390 | Sayler | Oct. 31, 1950 |
| 2,613,128 | Baumann et al. | Oct. 7, 1952 |

FOREIGN PATENTS

| | | |
|---|---|---|
| 613,781 | Great Britain | Dec. 2, 1946 |

OTHER REFERENCES

Organic Chemistry, Julius Schmidt, 6th ed., Gurney and Jackson (London), 1950, p. 607.